May 3, 1966 R. E. MIERENDORF 3,249,838
FULL WAVE D.C. MOTOR SPEED AND POSITION CONTROL SYSTEM
Filed April 2, 1963 2 Sheets-Sheet 1

INVENTOR.
ROBERT E. MIERENDORF
BY
William H. Schmeling

May 3, 1966 R. E. MIERENDORF 3,249,838
FULL WAVE D.C. MOTOR SPEED AND POSITION CONTROL SYSTEM
Filed April 2, 1963 2 Sheets-Sheet 2

INVENTOR.
ROBERT E. MIERENDORF
BY

United States Patent Office 3,249,838
Patented May 3, 1966

BEST AVAILABLE COPY 3,249,838
FULL WAVE D.C. MOTOR SPEED AND
POSITION CONTROL SYSTEM
Robert E. Mierendorf, Milwaukee, Wis., assignor to
Square D Company, Park Ridge, Ill., a corporation of
Michigan
Filed Apr. 2, 1963, Ser. No. 269,922
12 Claims. (Cl. 318—257)

This invention relates to control circuits and is more particularly concerned with an apparatus for controlling in stepless increments the flow of current from an alternating current source to a direct current load, such as the armature winding of a reversible direct current motor.

In various applications for reversible direct current loads, such as a reversible direct current motor as used in automatic positioning control systems, a command signal source is provided to control the energization of the motor to cause movement of a member of a machine relative to another machine member until the members are in a desired relative position to one another. While the system hereinafter disclosed is not limited to the control of energization of a reversible direct current motor, it is particularly suited to control the direction and magnitude of direct current flow in a main drive system of a precision machine tool which is provided with an automatic positioning control.

In positioning systems for machine tools, a transducer is usually provided to indicate whether or not certain parts of the machine are properly positioned in a desired location relative to one another. In certain positioning systems, as for example the type disclosed in the patent granted Bulliet, Patent No. 2,962,652, and an application for patent by Robert C. Mierendorf, Serial No. 256,975, filed February 7, 1963, a system is disclosed which will not only indicate the direction of displacement of one machine part relative to another machine part but will also indicate within limits the degree of displacement as well as when the parts are properly positioned relative to each other. In the positioning systems disclosed in both the patent and patent application supra, either a hydraulic or electric motor may be used to position the machine parts.

It is well known that both the direction and speed of rotation of a reversible direct current motor can be controlled by step type contactors and motor generator sets. These both possess inherent disadvantages in that the former fail to provide smooth increment-free acceleration and deceleration of the motor and the latter are bulky and expensive. Special half wave grid controlled thyratron circuits also have been used to control reversible current to direct current motors. These systems possess the advantages of being compact and providing increment-free acceleration and deceleration of the motor. However, half wave systems possess the disadvantage of causing additional motor heating and usually requiring motors of a large size to provide the same torque output as is produced by a direct current motor energized with full wave rectified current.

Full wave operation of direct current motors in positioning systems using polyphase alternating current sources and complicated grid control circuits for the electronic switches, such as thyratrons, have been used to provide the rectification of the alternating current supply. The use of a polyphase alternating current frequently causes problems in installations where a polyphase source is not available and thus increases the costs of the installation which would otherwise not require a polyphase source. Heretofore, when a single phase alternating current source was used to supply a motor with full wave rectified reversible current, difficulties have been encountered as the control operated near the point of reversal of the motor. In positioning systems it is readily apparent that if the motor is to drive one machine part to an exact desired position, it may be necessary that the motor rotate until the parts are exactly in the desired position and reverse to achieve exact positioning. This requirement dictates that two or more rectifiers which supply full wave current for one direction of motor rotation must continue to conduct until the motor reaches a standstill and the two or more rectifiers which conduct rectified current in the opposite direction of motor rotation must instantly conduct to cause the motor to rotate in the opposite direction. This condition is conducive to the creation of short circuit currents of sufficient magnitude to damage the components of the control system.

The present invention is designed to overcome the deficiencies noted above and provides a system wherein the current from a single phase alternating current supply is controlled so a reversible direct current motor is supplied with full wave rectified current of either polarity when rapid rotation of the motor is required. When the motor is to rotate slowly or is to be locked in position, small half wave rectified current pulses which alternate during opposite polarities of the supply are supplied to the motor.

It is an object of the present invention to provide a system for controlling current flow from a single phase alternating current source to a direct current load, such as a reversible direct current motor which will provide the motor with full wave rectified current of either polarity when the motor rotates rapidly and with small half wave rectified current pulses which alternate in polarity during opposite polarities of the supply when the motor rotates slowly or is in at rest position to achieve the foregoing without providing a short circuit through the rectifiers which shorts or shunts the motor windings.

A further object of the present invention is to provide a system for controlling in stepless increments the flow of rectified current from a single phase alternating current source to a direct current load such as a reversible direct current motor as used in a positioning system for a machine tool and to regulate the flow of rectified current so that the motor is supplied with small half wave rectified current pulses which alternate in polarity when the motor is at rest and to achieve the foregoing without completing a short circuit path through the rectifiers for the single phase supply.

Another object of the present invention is to provide a positioning control system for a machine tool wherein the armature of a direct current motor is supplied with full wave rectified direct current pulses of maximum magnitude of either polarity from a single phase alternating current supply when the motor is required to rotate rapidly and to vary the magnitude of current pulses to the motor in stepless increments from the maximum magnitude to small half wave current pulses of alternate polarity when the rotation of the motor is not required.

A still further object is to provide a novel firing circuit which controls the initiation of conduction of unidirectional conducting devices to accomplish the foregoing object.

Further features and objects of the invention will be readily apparent to those skilled in the art from the specification and appended drawing illustrating certain preferred embodiments in which.

Figure 1:
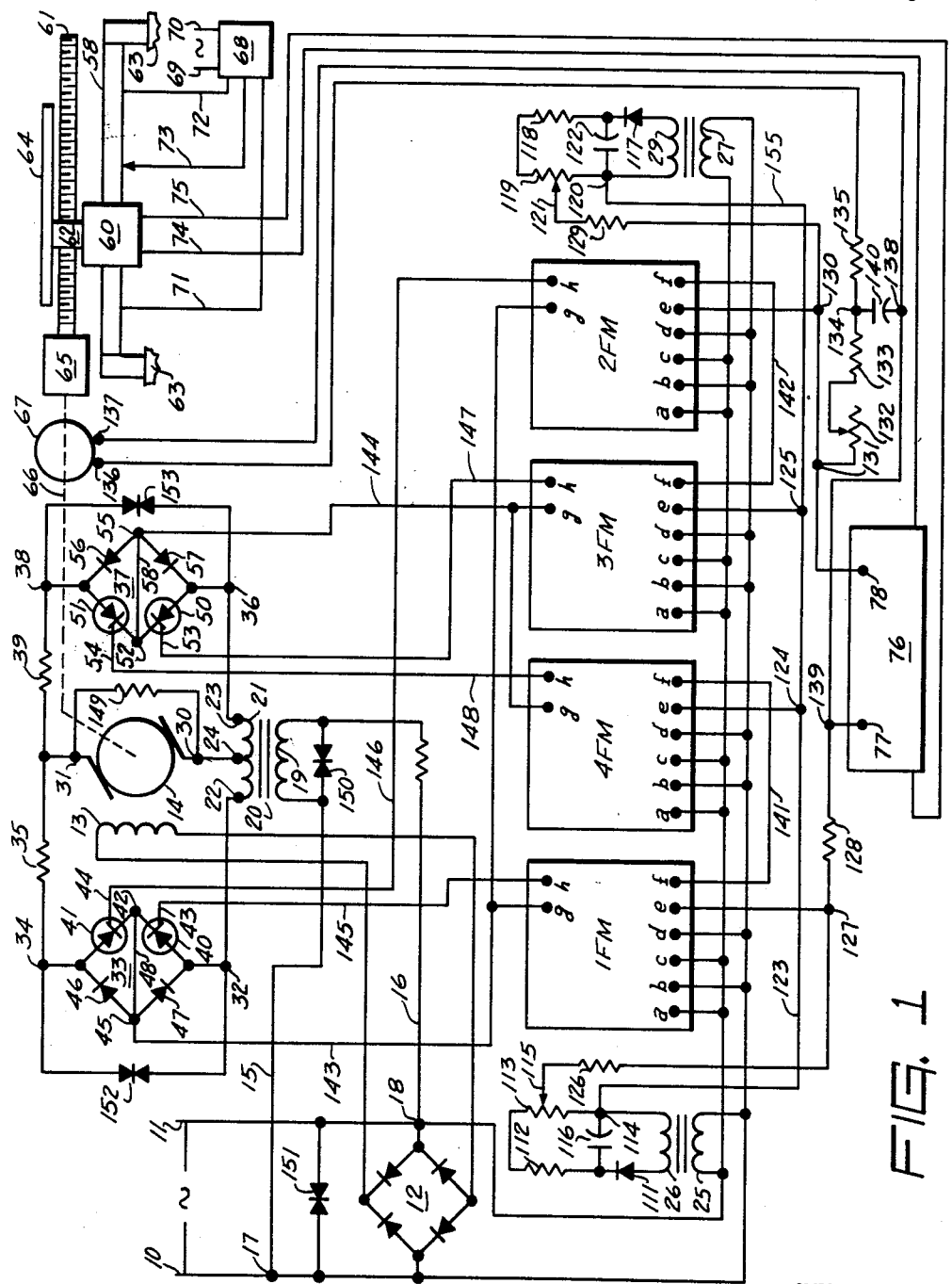
FIG. 1 is a circuit diagram of one embodiment of my invention including certain components of a positioning control system which are illustrated diagrammatically.

In FIG. 1 of the drawings a set of conductors 10 and 11 are arranged to be connected to a suitable supply of single phase alternating current. The conductors 10 and 11 are connected across the input terminals of a full wave rectifier 12 to supply a field winding 13 of a reversible direct current motor 14. The conductors 10 and 11 are also connected through a pair of conductors 15 and 16 at junctions 17 and 18 to supply a primary winding 19 of a transformer 20 which has a secondary winding 21. The secondary winding 21 is provided with a pair of output terminals 22 and 23 and a center tap terminal 24. The conductors 10 and 11 are also connected to supply a primary winding 25 of a transformer which has a secondary winding 26 and a primary winding 27 of a transformer which has a secondary winding 29.

The system shown in FIG. 1 also includes four circuit modules designated 1FM, 2FM, 3FM and 4FM, which control the initiation of conduction of unidirectional conducting switches as used in the circuit in FIG. 1, as will be hereinafter described. The conductors 10 and 11 are connected through suitable junctions to supply the input terminals a, b, c and d of the respective circuit modules 1FM–4FM, as shown.

The motor 14 has an armature winding connected to a pair of motor input terminals 30 and 31. This input terminal 30 is connected directly to the center tap 24 of transformer secondary winding 21. The output terminal 22 of the transformer secondary winding 21 is connected through a junction 32 and a full wave bridge rectifier 33, as will be hereinafter described, to a junction 34 which in turn is connected through a resistor 35 to the input terminal 31 of motor 14. Similarly, the output terminal 23 of the transformer secondary winding 21 is connected through a junction 36 and a full wave bridge rectifier 37, as will be hereinafter described, to a junction 38 which in turn is connected through a resistor 39 to the input terminal 31 of motor 14.

The bridge rectifier 33 includes a pair of oppositely poled unidirectional conducting switches or devices, each of which has a control electrode for initiating the conductive periods of the devices when the direction of current flow provided by the source is complementary with the direction of current flow of the device. In the embodiment shown in FIG. 1, these devices are illustrated as silicon controlled rectifiers 40 and 41. The rectifier 40 has an anode connected to the junction 32 and a cathode connected to a junction 42 and a control electrode known as a gate, indicated by a numeral 43. The rectifier 41 has an anode connected to the junction 34 and a cathode connected to the junction 42 and a control electrode known as a gate, indicated by a numeral 44. The bridge rectifier 33 may also include a junction 45 and a pair of diodes 46 and 47 and a lead 48 connecting junctions 42 and 45. The riodes 46 and 47 are unidirectional devices which are poled to respectively conduct current from the junction 45 to the junctions 34 and 32.

The bridge rectifiers 37 include a pair of oppositely poled unidirectional conducting switches or devices, each of which has a control electrode for initiating the conductive periods of the devices when the direction of current flow provided by the source is complemetary with the direction of current flow of the device. In the embodiment shown in FIG. 1, these devices are illustrated as silicon controlled rectifiers 50 and 51. The rectifier 50 has an anode connected to the junction 36 and a cathode connected to a junction 52 and a control electrode known as a gate indicated by numeral 53. The rectifier 51 has an anode connected to the junction 38 and a cathode connected to the junction 52 and a control electrode known as a gate indicated by a numeral 54. The bridge rectifier 37 may also include a junction 55 and a pair of diodes 56 and 57 and a lead 58 connecting the junctions 52 and 55. The diodes 56 and 57 are unidirectional conducting devices which are poled to respectively conduct current from the junction 55 to the junctions 38 and 36.

The positioning system illustrated in FIG. 1 is fully described in the Bulliet patent and the Mierendorf applicartion and includes a transducer having a primary transformer winding 58 and a secondary winding 60. The primary winding 58 may be mounted on a stationary member or support of the machine tool which it controls. The secondary winding 60, which is inductively coupled to the primary winding 58, is movable by a lead screw 61 through a coupling 62 which is threadedly connected to screw 61. The screw 61 may be used to move a movable member 64 of the machine. For example, if the positioning system is used with a vertical spindle drilling machine, the primary winding 58 may be mounted on the base of the machine indicated by a numeral 63 and the secondary winding 60 mounted on the movable table which is indicated by a numeral 64 and which is connected to be moved relative to the base 63 by the lead screw 61. The lead screw is shown as driven by a gear box 65 which is connected to be driven by the motor 14 through a suitable connection as represented by a broken line 66. The broken line connection also is shown as providing a driving connection for a tachometer generator 67.

An input signal source for the positioning control system is designated by a numeral 68, and is fully disclosed in the Mierendorf application, supra. The source 68 is energized by a single phase alternating current source connected to a pair of leads 69 and 70 and provides an alternating current and voltage through leads 71, 72 and 73 to the primary winding 58. The leads 71 and 72 are arranged relative to the lead 73 so the instantaneous polarity of the leads 71 and 72 are identical. The lead 73 is connected through a suitable switching arrangement, not shown, to a plurality of taps, not shown, which are spaced at predetermined intervals longitudinally along the primary winding 61. It will be seen that if the secondary winding 61 is located to the left of the selected tap connected to the lead 58, then the voltage induced in the secondary winding 61 by the portion of the primary winding energized between the leads 71 and 73 will predominate and the secondary will produce an output signal at a pair of leads 74 and 75, the phase of which will reflect the direction of current flow from the lead 71 to the lead 73. As the secondary winding 60 approaches the position on the primary winding 58 to which lead 73 is connected, the portion of the primary winding between the lead 72 and the lead 73 will induce current in the secondary winding 60 which will tend to cancel the current induced in the secondary winding 60 by the portion of the primary winding between the lead 71 and the lead 73 so that the output signal of the secondary winding 60 will change both in phase and magnitude as the secondary winding 60 approaches the tap selected on the primary winding to which the lead 73 is connected. When the secondary winding 60 is properly positioned at the selected tap, the currents induced therein by the portions between the leads 71–73 and the leads 72–73 will be equal and opposite so the output current and voltage will be zero. The output leads 74 and 75 are connected as inputs to a suitable phase detector which is diagrammatically shown and indicated by a numeral 76. The phase detector 76 which may be any of several well known types, is arranged to translate the alternating current output signal of the secondary winding 60 to an appropriate direct current signal having a polarity indicative of the direction of displacement of the secondary winding from the tap connected to the lead 73 and a magnitude reflective within limits of the degree of displacement. The output of the phase detector appears at a pair of output terminals 77 and 78.

The foregoing explanation of the positioning system which includes the means 68 for supplying a command signal, the primary winding 58, the secondary winding 60 and the phase detector 76 is included to facilitate understanding of the remaining portions of the circuit shown in FIG. 1. It is to be appreciated that other position indicating schemes may be employed to indicate the direction and degree of displacement of one member relative to another member of a machine.

Figure 2:
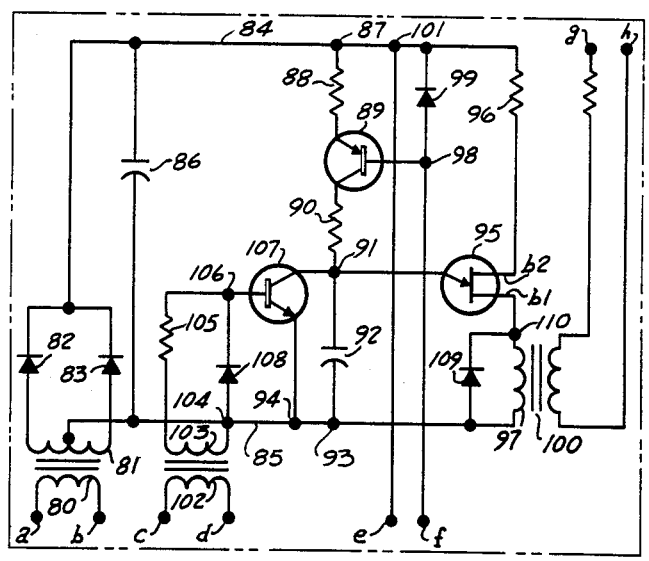
FIG. 2 is a circuit diagram of one of the control circuit components shown diagrammatically in FIG. 1.

Before a further description of the circuit shown in FIG. 1 is undertaken, it is believed a description of the circuit in FIG. 2 is advisable. The circuit shown in FIG. 2 is included in each of the modules 1FM–4FM, as shown in FIG. 1, and therefore the inputs and output terminals indicated in FIG. 2 are similarly designated in the respective modules 1FM–4FM in FIG. 1. The terminals a, b, c and d are connected through leads 10 and 11 to the single phase source which supplies the motor 14 with current. The terminals a and b are connected as input terminals of a primary winding 80 of a transformer which has a secondary winding 81. The secondary winding 81 is center tapped and connected through a suitable rectifier, shown as diodes 82 and 83, to supply a pair of leads 84 and 85 with direct current making the lead 84 positive in polarity relative to the lead 85. A capacitor 86 acts as a filter for the voltage between leads 84 and 85. Connected in a series circuit between lead 84 and lead 85 is a junction 87, a resistor 88, an emitter and collector of a PNP type transistor 89, a resistor 90, a junction 91, a capacitor 92 and a junction 93. Connected in parallel with the capacitor 92 is a npn type transistor 107 which has a collector connected to the junction 91 and an emitter connected to the lead 85 at a junction 94. The junction 91 is connected to an emitter electrode of a unijunction type transistor 95 which has a base electrode b2 connected through a resistor 96 to the lead 84 and a base electrode b1 connected through a primary winding 97 of a transformer 100 to the lead 85. The transistor 89 has a base electrode connected to a junction 98 which is connected through a diode 99 to lead 84 and to a signal input terminal f. Another input terminal e for the module is connected to a junction 101 in the lead 84. The terminals c and d are connected as input terminals of a primary winding 102 of a transformer which has a secondary winding 103. One of the output terminals of the secondary winding 103 is connected to a junction 104 in lead 85. The other output is connected through a resistor 105 to a junction 106 which in turn is connected to the base electrode of the transistor 107. A diode 108 is connected to conduct current from the junction 104 to the junction 106. A diode 109 is connected to conduct current from the lead 85 to a junction 110 located between the transformer primary winding 96 and the electrode b1 of the unijunction transistor 95. The transformer 97 has a secondary winding connected to supply output terminals g and h of the module.

The operation of the circuit shown in FIG. 2 is as follows. The transformer secondary winding 81 including the diodes 82 and 83 and the capacitor 86 supply a full wave rectified direct current to the leads 84 and 85 making the lead 84 positive in polarity relative to the lead 85.

During intervals of either zero potential between the terminals e and f or when the terminal f has a positive polarity relative to the terminal e, either no current will flow from the terminal f towards the terminal e or when the terminal f is positive relative to the terminal e, current will flow from the terminal f to the junction 98 and through the diode 99 to the junction 101 to the terminal e. During these periods, the transistor 89 will be biased against conduction.

During intervals when the terminal e has a positive polarity relative to the terminal f, current flow from the terminal e to the terminal f through the foregoing circuit will be blocked by the diode 99 and current will flow from the terminal e through a circuit which includes the junction 101, the junction 87, the resistor 88, the emitter to base of the transistor 89 to the junction 98 and the terminal f. The intensity of the emitter to base current of the transistor 89 dictates the conduction of the transistor 89 and therefore the rate of charging of the capacitor 92 from the lead 84 through a circuit which includes the junction 87, the resistor 88, the emitter to collector electrodes of the transistor 89, the resistor 90, the junction 91, the capacitor 92 and the junction 94 in the lead 85.

During each half cycle of the alternating current supply, the transformer secondary winding 103 provides an alternating current pulse. During the half cycles when the current flows from the transformer secondary winding 103 through the resistor 105 to the junction 106, current flows from the base to emitter of the transistor 107, biasing the transistor 107 to conduction and providing a short circuit path for the charging current of the capacitor 92. During the half cycle when transformer secondary winding 103 causes the junction 104 to have a positive polarity relative to the junction 106, the diode 108 conducts. The voltage drop across the diode 108 causes the junction 94 to be positive relative to the junction 106 and the transistor 107 becomes nonconductive so that the capacitor 92 charges at a rate determined by the conduction of the transistor 89. As the charge on the capacitor 92 increases, the potential at the junction 91 becomes increasingly positive. When the potential at the junction 91 exceeds the intrinsic standoff ratio of the potential difference between the b2 and b1 electrodes of the unijunction transistor 95, the unijunction transistor switches from a non-conductive state to a conductive state and the capacitor 92 discharges through a circuit which includes the junction 91, the emitter to base b1 of the transistor 95, the junction 110, the transformer primary winding 97 and the junction 93. The discharge current of the capacitor 93 through the transformer primary winding 96 causes the secondary winding to provide sharp output voltage pulses at the terminals g and h.

The diode 109 is connected to conduct and thereby suppress reverse currents and voltage outputs in the secondary winding of the transformer 97 which would be transmitted to the gates of the rectifiers 40, 41, 50 and 51.

Summarizing the foregoing, it will appear that the transistor 107 synchronizes the operation of the firing circuit with the alternating current supply and assures that the capacitor 92 will be discharged at the beginning of each half cycle of the alternating current wave of the supply. The unijunction transistor 95 will switch to its conductive state when the voltage across the capacitor 92 equals the intrinsic standoff ratio of the potential difference between the electrodes b2–b1 of the transistor 95 and the time required to charge the capacitor 92 during a half cycle is governed by the current through the collector electrode of the transistor 89. Current flowing in the terminal e and out of the terminal f biases the transistor 89 to conduction which causes the collector current of the transistor 89 to charge the capacitor 92 at a rate which is a function of the collector current. Current flowing in the terminal f and out of the terminal e biases the transistor 89 against conduction and results only in a small leakage current to the capacitor 92 which is insufficient to charge the capacitor 92 during a half cycle of the alternating current supply. The transformer 97 has a secondary winding arranged to provide a firing pulse to the terminals g and h when the unijunction transistor 95 conducts.

Referring again to FIG. 1, the transformer secondary winding 26 has its output terminals connected in circuit with a diode 111, a resistor 112, a potentiometer resistor 113 and a junction 114 so an adjustable tap 115 has a positive polarity relative to junction 114. The resistor 112 and a capacitor 116 act as a filter for the rectified output of the secondary winding 26. Similarly, the transformer secondary winding 29 has its output terminals connected in a circuit with a diode 117, a resistor 118, a potentiometer resistor 119 and a junction 120 so an adjustable tap 121 has a positive polarity relative to junction 120. The resistor 118 and a capacitor 122 act as a filter for the rectified output of the secondary winding 29.

The junction 114 and the junction 120 are connected by a lead 123. The terminals e of the modules 4FM and 3FM are connected to the lead 123 at junctions 124 and 125. The adjustable tap 115 is connected through a resistor 126 to a junction 127 which is connected to the input terminal e of module 1FM. The junction 127 is also connected through a resistor 128 to the output terminal 77 of the phase detector 76. The adjustable tap 121 is connected through a resistor 129 to a junction 130 which in turn is connected to the input terminal e of module 2FM. The junction 130 is also connected through a junction 131 to the terminal 78 of the phase detector 76. The junction 131 is connected through potentiometer resistor 132, a resistor 133, a junction 134, and a resistor 135 to an output terminal 136 of tachometer 67. The tachometer 67 has another output terminal 137 connected through a junction 138 to the terminal 77 of the phase detector 76 at a junction 139. A capacitor 140 connected between junctions 134 and 138 smoothens the output signal from tachometer 67.

The terminal f of the module 1FM is connected to the terminal f of the module 4FM by a lead 141. Similarly, the terminal f of the module 2FM is connected to the terminal f of the module 3FM by a lead 142.

The terminals g of the modules 1FM and 2FM are connected to the junction 45 by a lead 143. Similarly, the terminals g of the modules 4FM and 3FM are connected to the junction 55 by a lead 144. The terminals h of the modules 1FM, 2FM, 3FM and 4FM are respectively connected to the gate electrodes 43, 44, 53 and 54 of the silicon controlled rectifiers 40, 41, 50 and 51 by leads 145–148 respectively.

As shown in FIG. 1, the rectifiers 46, 47, 56 and 57 are used to block high reverse transient voltages from damaging the silicon controlled rectifiers 41, 43, 56 and 57. The resistors 35 and 39 act as current limiting impedances and prevent excessive currents from damaging either the control components or the motor 14. A resistor 149 provides a low inductance path for currents when the silicon controlled rectifiers 41, 43, 56 and 57 initially conduct. The resistor 149 additionally provides a circuit path for inductive currents generated within the armature winding. The back to back blocking rectifiers 150, 151, 152 and 153 act as transient voltage suppressors in the circuits associated therewith.

Figure 3:
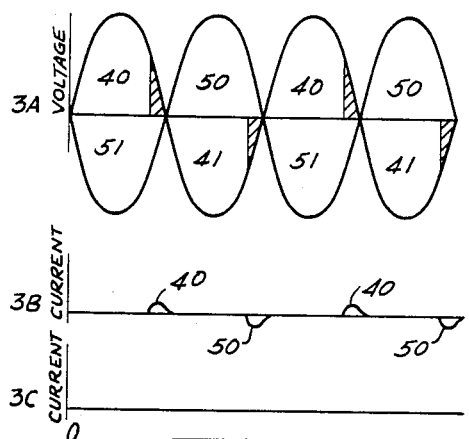
FIGS. 3, 4 and 5 show a series of curves of the voltages impressed across and currents flowing through the rectifiers and the motor for various operating conditions of the system shown in FIG. 1.
Figure 4:
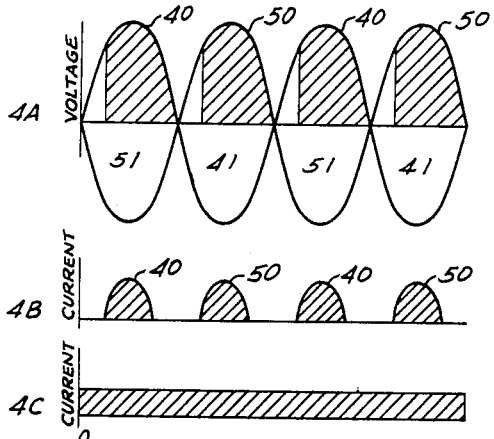
Figure 5:
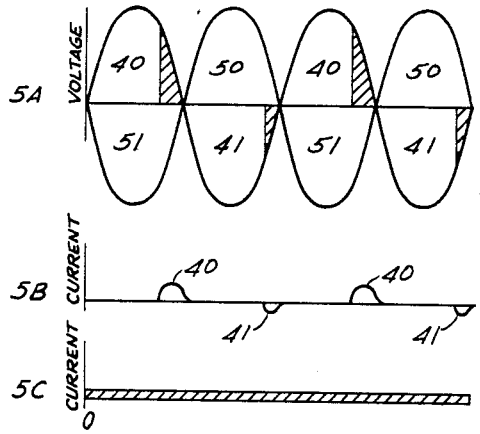

The operation of the control circuitry shown in FIG. 1 will now be described in connection with the curves shown in FIGS. 3, 4 and 5. When the movable member 64 of the machine tool is in position relative to the stationary member 63, as dictated by the command signal source 68, the output signal from the secondary winding 60 of the positioning transducer will be zero and the leads 74 and 75 will supply a corresponding zero signal to the phase detector 76. The phase detector 76 in response to a zero input signal supplies a zero signal to the terminals 77 and 78. The potentiometer resistors 113 and 119 are adjusted to provide equal potentials at the adjustable taps 115 and 121. Thus during the interval when the phase detector 76 causes the terminals 77 and 78 to be at equal zero potential, current will flow from the tap 115 through the resistor 126 to the junction 127 where it enters as an input to the terminal e of the module 1FM and exits at the terminal f of the module 1FM. The current flow exiting from the terminal f of the module 1FM is conducted as an input to the terminal f of the module 4FM by the lead 141. The input at the terminal f of the module 4FM exits as an output at the terminal e of the module 4FM and is returned to the bias circuit at the junction 114 by the lead 123. Similarly, during the interval when the phase detector 76 causes the terminals 77 and 78 to be at equal zero potential, current will flow from the tap 121 through the resistor 129 to the junction 130 where it enters as an input to the terminal e of the module 2FM and exits at the terminal f of the module 2FM. The current flow exiting from the terminal f of the module 2FM is conducted as an input to the terminal f of the module 3FM by the lead 142. The input at the terminal f of the module 3FM exits as an output at the terminal e of the module 3FM and is returned to the bias circuit at the junction 121 by a lead 155.

The input to the terminals e of the modules 1FM and 2FM respectively cause an output pulse at the terminals h of the modules 1FM and 2FM which is transmitted to the gates 43 and 44 of the rectifiers 40 and 41 by the leads 145 and 146. This output pulse biases the rectifiers 40 and 41 to conduction during the respective half cycles when their anodes are positive at an instant determined by the occurrence of the firing pulse from the modules 1FM and 2FM. Likewise, the input to the terminals f of modules 4FM and 3FM from the terminals f of the modules 1FM and 2FM respectively prevents the occurrence of a signal pulse at the terminals h of the modules 4FM and 3FM so that the rectifiers 51 and 52 remain non-conductive.

The transformer secondary 103 in FIG. 2 synchronizes the conduction of the transistor 107 so that the charging of the capacitor 92 may begin only at the beginning of the respective half cycles voltages of the alternating current source. The polarity of each of the transformer secondary windings 103 in each of the modules 1FM–4FM is arranged so that the transistors 107 in the modules 1FM–4FM is biased to conduction during the half cycle preceding the half cycle during which the respective rectifiers 40, 41, 50 and 51 anode voltage has a positive polarity. Thus the firing pulse which is provided by the terminals h and g of the modules 1FM–4FM to the gate to cathode electrodes of the respective rectifiers will be present, making the gate which is connected to the terminal h positive, relative to the cathode which is connected to the terminal g during the half cycle when the anode of the rectifier is positive relative to the cathode. The instant at which conduction of the respective controlled rectifiers is initiated during the respective half cycles will depend upon the rate of charging of the capacitors 92 within the respective modules 1FM–4FM.

During the interval when the secondary winding 60 is precisely in proper position relative to the primary winding 58, the terminals 77 and 78 will provide a zero output and the bias sources provided by the adjustable taps 115 and 121 will prevent the modules 3FM and 4FM from providing an output firing pulse to the gates of the rectifiers 50 and 51. However, the bias sources at the taps 115 and 121 will provide a small minimum input signal to the terminals e of the modules 1FM and 2FM. This small input signal will cause the capacitor 92 to charge sufficiently to cause the unijunction transistor 95 to conduct late in the half cycle periods when the anodes of the rectifiers 40 and 41 are positive so the positive voltage pulse present at the terminal h of the modules 1FM and 2FM causes the rectifiers 40 and 41 to conduct at the instants shown on curve 3A.

It will be seen that as the rectifiers 41 and 40 conduct current as shown on curve 3A, the armature of motor 14 is supplied with half wave rectified pulses of alternate polarity current as shown on the curve 3B. These half wave alternate polarity pulses will cause the motor to be locked in position without rotation as the net direct current component of the armature current will be zero, as shown in curve 3C.

When the command signal source 68 is adjusted to reposition the member 64 relative to the member 63, an output signal will be generated by the secondary winding 60. This output signal will appear as a direct current signal at the terminals 77 and 78 with a polarity indicative of the direction in which the motor 14 is required to rotate to reposition the member 64 in the new selected location. If the extent of traverse of the member 64 is extensive, the signal at the terminals 74 and 78 will be at a maximum. If the polarity of the signal from the secondary winding 60 is such as to make the terminal 77 positive, relative to the terminal 78, signal current will flow from the terminal 77 to the junction 139 through the resistor 128 to the junction 127 from whence it enters the module 1FM at the terminal e and exits therefrom at the terminal f. The signal current from the terminal f of the module 1FM is transmitted by the lead 141 to the input terminal f of the module 4FM from which it exits at the terminal e. The signal current exiting from the terminal e of the module 4FM is transmitted through the junctions 124 and 125 as an input signal to the terminal e of the firing module 3FM. This signal current exits from the firing modules 3FM at the terminal f and is transmitted via the lead 142 as an input to the terminal f of the firing module 2FM. The signal current then exits from the terminal e of the module 2FM and is returned via the junctions 130 and 131 to the terminal 78. Thus it will be seen that a large positive signal at the terminal 77 will cause the firing modules 1FM and 3FM to provide output voltage signals at the terminals h which causes the rectifiers 40 and 50 to be conductive early in the half cycle during which their respective anodes are positive as is shown on curve 4A. The combination of the line voltage and back E.M.F. of the motor 14 will cause the rectifiers to conduct current as shown on curve 4B and provide a net D.C. current in the armature of the motor 14, as shown on curve 4C. During this interval the input signals to the terminals f of the modules 3FM and 4FM will overcome any bias provided by the adjustable taps 115 and 121 so that the firing modules 4FM and 3FM will be prevented from providing an output firing pulse to the rectifiers 41 and 51. The motor 14 when energized by the current shown in curve 4C will rotate in a direction to restore the new selected position of the member 64 relative to the member 63. The rotation of the motor 14 drives the tachometer generator 67 which has output terminals 136 and 137. The output terminal 136 is connected through the adjustable potentiometer 132 to terminal 78 and the output terminal 137 is connected to the terminal 77. The polarity of the terminals 136 and 137 is preferably arranged to oppose the polarity between the terminals 77 and 78 so as to provide a negative feedback signal to prevent overspeeding of the motor 14.

As previously indicated, as the members 64 and 63 move toward the desired relative position with one another, as dictated by the signal source 68, the magnitude of the signal from the secondary winding 60 decreases, and reduces the potential between the terminals 77 and 78. As the potential difference between the terminals 77 and 78 decreases, the instant of occurrence of the pulse output of the firing modules 1FM–4FM progressively occurs later during the respective half cycles of the voltage supply. Thus as the potential at terminal 77 decreases, the occurrence of the firing pulse to the rectifiers 40 and 50 progressively occurs later during the half cycle and approaches the instant of the firing as shown on the curve 3A while the firing of the rectifier 41 progressively occurs earlier and begins to approach the instant of firing as shown on the curve 3A. This effect is shown on curve 5A wherein the rectifier 40 is conductive during a greater portion of the positive half cycle of its anode supply than controlled rectifier 41. This causes the rectifiers 40 and 41 to conduct current pulses as shown on curve 5B to provide a net armature current for the motor 14 as is shown on curve 5C. As the signal from the secondary winding 60 changes to cause the change in conduction as illustrated by the curves 4A and 5A, the bias provided by the adjustable taps 115 and 121 becomes increasingly effective upon the circuitry within the modules 4FM and 3FM to prevent initiating conduction of the rectifiers 50 and 51 so the change in energization of the motor 14 occurs in stepless increments as the member 64 approaches the desired position relative to the member 63.

It is to be appreciated that when the command signal source 68 is adjusted to cause the relative movement of the members 64 and 63 in the reverse direction, the terminal 78 will be positive relative to the terminal 77 and the firing modules 3FM and 4FM will cause the conduction of the rectifiers 41 and 51 to occur which will cause the opposite direction of rotation of the motor 14. As the firing of these rectifiers under maximum current conditions and minimum current conditions is identical with the firing of the rectifiers 40 and 50, further explanation is not believed necessary.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. A current controlling apparatus for supplying reversible rectified direct current to a direct current device from a single phase alternating current source in response to an input signal from a signal source, comprising in combination; a first pair of oppositely poled unidirectional conducting externally controllable electronic switches connected between a first output terminal of the alternating current source and an input terminal of the device, a second pair of oppositely poled unidirectional conducting externally controllable electronic switches connected between a second output terminal of the source and said input terminal of the device, and means responsive to the input signal and connected to said electronic switches for controlling the conduction of said switches and operable in response to the input signal for selectively causing the first pair of electronic switches to supply the device with full wave pulses of alternating current and a selected switch of each pair of switches to conduct for supplying the device with full wave pulses of rectified direct current.

2. The combination as set forth in claim 1 wherein said source includes a center tapped transformer winding and the device has a second terminal connected to the center tap of said transformer.

3. The combination as set forth in claim 1 wherein said means is arranged to cause the electronic switches to selective supply- the device with full wave pulses of rectified direct and alternating current of varying magnitude.

4. In a position control system having a direct current motor and a signal source arranged to supply signals of opposite polarity of varying magnitude and a zero output signal, the combination comprising; an alternating current source, a first pair of oppositely poled unidirectional conducting electronic switches connected between a first output terminal of the alternating current source and an input terminal of the motor, a second pair of oppositely poled unidirectional conducting electronic switches connected between a second output terminal of the source and the said input terminal of the motor, each of said electronic switches having a control electrode for controlling the conduction periods of said switches, and an individual firing means for each of said switches, each of said firing means having an input connected to the signal source and an output connected to the control electrode and arranged to selectively render both of the switches of one pair of said switches conductive for supplying said motor with full wave pulses of alternating current during intervals of a zero output signal and for causing a selected one of the switches of each of the pairs of said switches to be rendered conductive and supply said motor with full wave rectified direct current having a polarity predetermined by the polarity of said signal.

5. In an apparatus adapted for controlling current flow between a single phase alternating current source and a reversible direct current motor, the combination comprising; a pair of unidirectional conducting devices connected in antiparallel between one terminal of the alternating current source and one terminal of the motor, a second pair of unidirectional conducting devices connected in antiparallel between another terminal of the source and the said one terminal of the motor, each of said devices having a control electrode arranged for initiating the conduction periods of said devices, and a firing means connected to the control electrodes for selectively causing both of the devices of a selected one of the pairs of devices to conduct and supply said direct current motor with pulses of full wave alternating current and for causing a selected device of each of the pairs of devices to conduct and supply the motor with pulses of full wave rectified direct current.

6. In an apparatus for controlling current flow to a reversible direct current motor in response to a signal from a signal source, the combination comprising; a source providing alternate half cycles of opposite polarity current, a transformer secondary winding having a pair of output terminals and a tap centered between the output terminals, said motor having an armature winding connected to a pair of motor input terminals with one of said motor input terminals connected to said center tap, a first pair of oppositely poled unidirectional conducting devices connected between one of the output terminals of the transformer secondary winding and the other of said motor input terminals, a second pair of oppositely poled unidirectional conducting devices connected between the other of the output terminals of the transformer secondary winding and the said other motor input terminal, each of said devices having a control electrode arranged for initiating conduction of the device associated therewith during the half cycles when the current polarity of the source is complementary with the conducting direction of the device, an individual firing means connected to the control electrode of each of said devices, said firing means being connected in circuit with the signal source to receive an input from the signal source and in response to said input signal provide an output signal to the control electrodes of said devices at a predetermined instant during the half cycle of said source, a bias means connected in the circuit between the signal source and firing means, said bias means being arranged to cause both of the devices of a selected pair of the devices to initiate conduction at a late instant in the respective half cycles of conduction of the respective devices for supplying the motor armature with equal magnitude pulses of alternating opposite polarity current during intervals of a zero signal from the signal source, said firing means being arranged to progressively increase the conduction interval during each half cycle of conduction of one of the devices in each pair while simultaneously descreasing the conduction interval during each half cycle of conduction of the other of said both devices of the selected pair in response to the polarity and magnitude of the signal from the signal source whereby the current flow in the motor armature progressively changes from alternating equal magnitude opposite polarity current pulses of small magnitude to full wave rectified direct current pulses having a polarity and magnitude dependent upon the polarity and magnitude of the signal from the signal source.

7. In an apparatus for controlling the magnitude and direction of direct current flow in an armature of a direct current motor in response to changes in magnitude and polarity of a signal from a signal source, the combination comprising; a transformer secondary winding energized from an alternating current source and having a pair of output terminals, a plurality of unidirectional conducting devices each having a control electrode, said devices being connected between the terminals of the transformer and motor armature for supplying the motor armature with pulses of full wave rectified direct current of either polarity, firing means having an input connected in a circuit with the signal source and an output connected to the electrodes of said devices for initiating the conduction of said devices and thereby controlling the polarity and magnitude of current flow in the motor armature in response to the signal from the signal source, and a bias means connected in series in said circuit and arranged to bias said firing means for causing both of the devices of a selected pair of said devices to conduct and supply the motor armature equal and small magnitude alternating opposite polarity current pulses during intervals of a zero signal from the signal source.

8. The combination as recited in claim 7 wherein the firing means includes a firing circuit individual to each of said devices and each firing circuit is arranged to provide a current pulse at a predetermined instant during the interval when the polarity of the alternating current supply and the conductive direction of the device is complementary for varying the magnitude of current flow in the motor armature in response to the magnitude of the input signal.

9. The combination as recited in claim 8 wherein the circuit which includes the firing means and signal source also includes a tachometer for supplying a negative feedback signal to the firing means.

10. The combination as recited in claim 8 wherein each firing circuit includes a first unidirectional conducting device having a control electrode connected in circuit with the input signal source and second unidirectional conducing device having a control electrode connected in circuit with the alternating current source for synchronizing the current pulses of the firing means with the source.

11. In a positioning control system, the combination comprising; a reversible direct current motor having an armature connected to an input terminal, a signal source providing a signal of varying magnitude and polarity depending upon the displacement of a member from a desired position, a single phase alternating current source, a pair of oppositely poled rectifiers connected between one terminal of the source and the input terminal of the motor, a second pair of opposite poled rectifiers connected between another terminal of the source and the motor input terminal, each of said rectifiers having a control electrode for initiating conduction periods of said rectifiers, a firing means having an input connected to the signal source and arranged to provide an output pulse synchronized with the alternating current source to the control electrodes of both rectifiers of a selected pair of said rectifiers for causing the rectifiers of the selected pair of rectifiers to conduct alternate polarity current pulses for locking the armature in position during intervals when the signal source is providing a zero signal and for progressively increasing the magnitude of said current pulses of one polarity and simultaneously decreasing the magnitude of the opposite polarity current pulses in accordance with an increase in the magnitude and polarity of the signal from the signal source and for causing a selected one of both of the pairs of rectifiers to conduct full wave rectified direct current pulses of progressively increasing magnitude as the signal from the signal source exceeds a predetermined value and progressively increases.

12. In a positioning control system, the combination comprising; means for providing a signal having a magnitude and polarity indicative of the magnitude and direction of displacement of one member relative to another member from a desired position, a reversible direct current motor operably connected to said members for moving said members in either of two directions to said position, a single phase source of alternating current, controllable rectifying means connected between the source and motor and arranged to conduct current from the source to the motor and means connected between the signal means and rectifying means for causing the rectifying means to conduct alternating current pulses from the source to the motor when said members are in the desired position and full wave rectified direct current pulses having a magnitude and polarity dependent upon the magnitude and polarity of the signal from the signal means when said members are displaced from the desired position.

References Cited by the Examiner

UNITED STATES PATENTS

| 2,329,127 | 9/1943 | Levy | 318—257 |
| 2,480,225 | 8/1949 | Dale | 318—257 |
| 2,778,982 | 1/1957 | Loeffler | 318—257 |
| 3,109,971 | 11/1963 | Welch et al. | 318—30 |

OTHER REFERENCES

Publication: W. R. Seegmiller, Controlled Rectifiers Drive A.C. and D.C. Motors, Electronics, Nov. 13, 1959, pp. 73–75.

ORIS L. RADER, *Primary Examiner.*

S. GORDON, D. F. DUGGAN, *Assistant Examiners.*

UNITED STATES PATENT OFFICE
Certificate of Correction

Patent No. 3,249,838

May 3, 1966

Robert E. Mierendorf

It is hereby certified that error appears in the above numbered patent requiring correction and that the said Letters Patent should read as corrected below.

In the Letters Patent (only), the five sheets of drawings and columns 1 through 14 of the printed specification of Patent No. 3,249,837 were inadvertently placed in the Patent No. 3,249,838, and should be deleted and the following inserted instead: